United States Patent
Jackson et al.

(10) Patent No.: US 7,822,091 B2
(45) Date of Patent: Oct. 26, 2010

(54) INVERTED COMPOSITE SLAB SANDWICH LASER GAIN MEDIUM

(75) Inventors: Paul E. Jackson, Longwood, FL (US); Nilo R. Salazar, Belle Isle, FL (US); Frederick G. Baum, Jr., Orlando, FL (US)

(73) Assignee: Lockheed Martin Corporation, Rockville, MD (US)

( * ) Notice: Subject to any disclaimer, the term of this patent is extended or adjusted under 35 U.S.C. 154(b) by 248 days.

(21) Appl. No.: 12/216,969

(22) Filed: Jul. 14, 2008

(65) Prior Publication Data
US 2010/0008389 A1    Jan. 14, 2010

(51) Int. Cl.
*H01S 5/00*    (2006.01)

(52) U.S. Cl. .................... 372/49.01; 372/6; 372/34; 372/39

(58) Field of Classification Search ............ 372/6, 372/34, 49.01, 39, 45.01, 50.1, 54, 66; 359/490
See application file for complete search history.

(56) References Cited

U.S. PATENT DOCUMENTS

| | | | | |
|---|---|---|---|---|
| 3,611,188 A | * | 10/1971 | Snitzer et al. ............. | 372/40 |
| 5,461,637 A | * | 10/1995 | Mooradian et al. .......... | 372/92 |
| 5,577,060 A | | 11/1996 | Nighan, Jr. et al. | |
| 6,055,260 A | * | 4/2000 | Byren et al. ............. | 372/72 |
| 6,072,814 A | | 6/2000 | Ryan et al. | |
| 6,094,297 A | | 7/2000 | Injeyan et al. | |
| 6,141,367 A | * | 10/2000 | Fan et al. ............. | 372/53 |
| 6,347,101 B1 | | 2/2002 | Wu et al. | |
| 6,625,193 B2 | | 9/2003 | Vetrovec | |
| 6,690,696 B2 | | 2/2004 | Byren et al. | |
| 6,873,639 B2 | | 3/2005 | Zhang | |
| 6,914,926 B2 | | 7/2005 | Comaskey et al. | |
| 7,103,078 B2 | | 9/2006 | Perry et al. | |
| 7,170,919 B2 | | 1/2007 | Zamel et al. | |
| 7,200,161 B2 | | 4/2007 | Vetrovec | |
| 7,280,571 B2 | | 10/2007 | Rothenberg | |
| 7,346,091 B2 | | 3/2008 | Spariosu et al. | |
| 7,428,257 B2 | * | 9/2008 | Kumkar et al. .......... | 372/71 |
| 7,668,211 B1 | * | 2/2010 | Sudesh et al. .......... | 372/6 |
| 2002/0118718 A1 | * | 8/2002 | Honea et al. .......... | 372/71 |
| 2005/0265403 A1 | | 12/2005 | Anderson et al. | |
| 2006/0227822 A1 | | 10/2006 | Goodno et al. | |

OTHER PUBLICATIONS

Y. Jeong et al, "Cladding-pumped ytterbium-doped large core fiber laser with 610W of output power" Optics Communications, Feb. 5, 2004, pp. 315-319.*

J.R. Lee et al., "High-Average-Power ND:Yag Planar Waveguide Laser That Is Face Pumped by 10 Laser Diode Bars," Optics Letters, vol. 27, No. 7, Apr. 1, 2002, 3 pages.

* cited by examiner

*Primary Examiner*—Minsun Harvey
*Assistant Examiner*—Delma R Forde
(74) *Attorney, Agent, or Firm*—Birch, Stewart, Kolasch & Birch, LLP

(57) ABSTRACT

The present invention pertains to a composite slab laser gain medium with an undoped core and at least one doped gain medium section disposed on at least one side of that core. The gain medium is constructed so as to mitigate the effects of thermal and mechanical stresses within it and also allow for impingement cooling of the doped gain medium section.

19 Claims, 9 Drawing Sheets

INVERTED COMPOSITE SLAB SANDWICH LASER GAIN MEDIUM

TECHNICAL FIELD OF THE INVENTION

The present invention pertains to a laser apparatus and a method for managing and reducing the negative impact of waste heat on laser beam quality and apparatus operation. Specifically, the invention pertains to a composite slab laser gain medium constructed so as to mitigate the effects of thermal and mechanical stresses within the gain medium and also allow for impingement cooling.

BACKGROUND OF THE INVENTION

The laser gain medium is the material that exhibits optical gain within a laser through stimulated emission sustained by a pump source. At high power levels, where area scaling of laser power is desirable, slabs of solid state material are typically used for the gain medium. These slabs generally exhibit strong thermal effects in the gain medium at high power levels. A strong temperature gradient may exist in the height direction of a solid-state slab gain medium, potentially causing unwanted thermal lensing and stress induced birefringence, as well as possibly causing the gain medium to crack due to thermal stresses.

Currently, composite gain media are made of doped and undoped material layers. A typical gain medium may be a doped Yttrium Aluminum Garnet (YAG) or sapphire crystal. Dopants are typically rare-earth ions such as neodymium (Nd) or ytterbium (Yb), or transition metal ions such as chromium (Cr).

Current composite laser gain media have an inner doped section sandwiched between an outer cladding of undoped material. A feature of this cladding is to thermally insulate the waste heat generated by pumping inside the doped section. This concentration of heat inside the laser gain medium produces a thermal gradient that results in a thermal lens because the refractive index of the solid-state gain medium depends on the temperature; warmer areas having steep gradients are less effective. Typically, a strong temperature gradient develops in the height direction of the medium, causing disparities in the optical path length and gain between the top, middle, and bottom portions. This heat gradient creates mechanical stresses in the gain medium that may cause optical birefringence. This combination of thermal lensing and birefringence contribute to optical phase distortion (OPD) of the gain medium in a laser resonator, resulting in degraded beam quality and reduced power extraction efficiency.

A sufficiently severe or prolonged thermal gradient, or ongoing exposure to this kind of thermal cycling, may cause or accelerate the mechanical failure of the solid state material. This may be evidenced by cracking in crystal media, permanent distortion in other media, separation of the doped and undoped layers, and other detrimental effects caused by ongoing, uneven thermal stress.

Furthermore, embodiments of doped-core slab laser media that are configured to allow direct cooling of the core, with the resonated beam axis passing through the coolant channels, cause further OPD as the beam passes through the coolant.

SUMMARY OF THE INVENTION

The present invention provides a composite solid-state slab laser gain medium that resolves the issue of thermal gradient formation, thereby resolving the associated issues of thermal lensing, birefringence, and accelerated mechanical failure. The invention accomplishes this by reversing the order of the doped and undoped layers, so that one or more doped laser gain medium slabs are disposed outside a core of undoped material. This makes the doped laser gain medium accessible for impingement cooling while allowing the undoped core to facilitate a pump cavity.

The doped and undoped layers are directly bonded together, with a reflective dichroic coating at the bond interface. This coating allows the pump light to pass from the undoped core and into the doped gain medium layer while completely reflecting the resonant light and thereby keeping it captured within the doped layer.

Impingement cooling of the slabs of gain media allows for better regulation and control of thermal effects as well as the virtual elimination of thermal gradients within the gain medium. Also, because the undoped core is not generating heat, it does not produce the same kind of thermal gradient a pumped gain medium would, thereby reducing or eliminating mechanical and structural stress issues associated with strong thermal gradients. Impingement cooling of the outer slabs of laser gain media results in evenly distributed temperatures, with the gain media being slightly cooler than the core, thereby further improving beam quality and power extraction efficiency.

The structural design of the undoped core laser gain medium according to the present invention enables impingement cooling of the gain medium without requiring the resonated beam to pass through the coolant channels, preventing OPD. Embodiments of the invention allow cooling of the gain medium without requiring any introduction of coolant into or through the gain medium itself. Embodiments of the gain medium are also conducive to the construction of a laser array comprised of multiple laser sources, each source having a gain medium according to the present invention.

Embodiments of the present invention may resonate light in straight or zig-zag paths through the gain medium, and may use only one resonator path in the gain medium, two resonator paths, or may feed light from one resonator path into the other to join two paths in series.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

SUMMARY OF DRAWINGS

The present invention will become more fully understood from the detailed description given hereinbelow and the accompanying drawings which are given by way of illustration only, and thus are not limitative of the present invention, and wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The present invention resolves issues of thermal lensing, birefringence, mechanical failure, optical beam distortion, and other difficulties and obstacles associated with currently known and used composite slab laser gain media.

Figure 1:
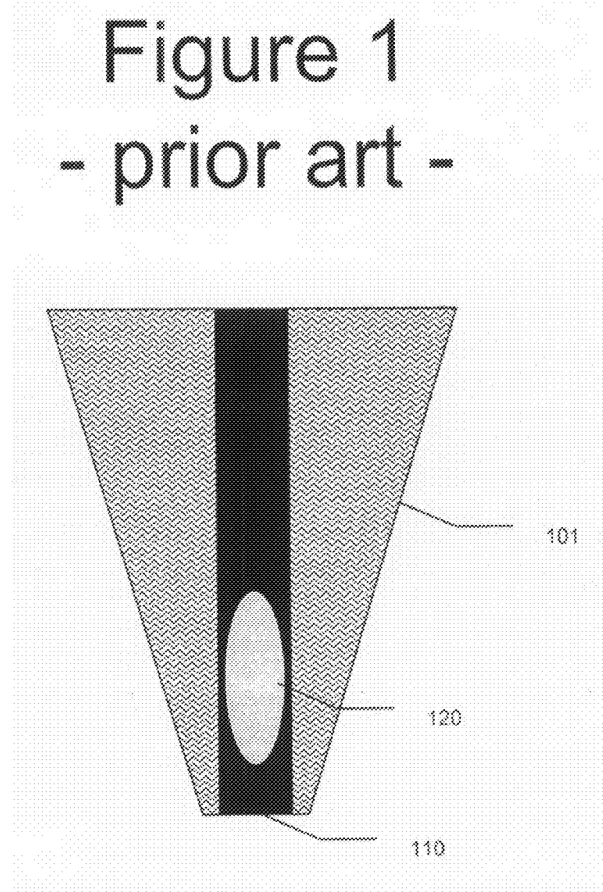
FIG. 1 is a block diagram of a prior art composite slab laser gain medium.

As shown in FIG. 1, currently used composite slab laser gain media are constructed of an ion-doped material core 110 sandwiched between layers of an undoped variant of the same material 101. The outside of the undoped layers is typically coated with a highly reflective coating (not shown) so that light pumped into the medium will be captured and absorbed within the gain medium. This can lead to the formation of a "hot spot" 120 within the doped core. The outer undoped layers trap heat accompanying stimulated emission in the doped core, which causes reductions in beam quality due to optical phase distortions (OPD) caused by the thermal gradient within the doped core.

Figure 2:
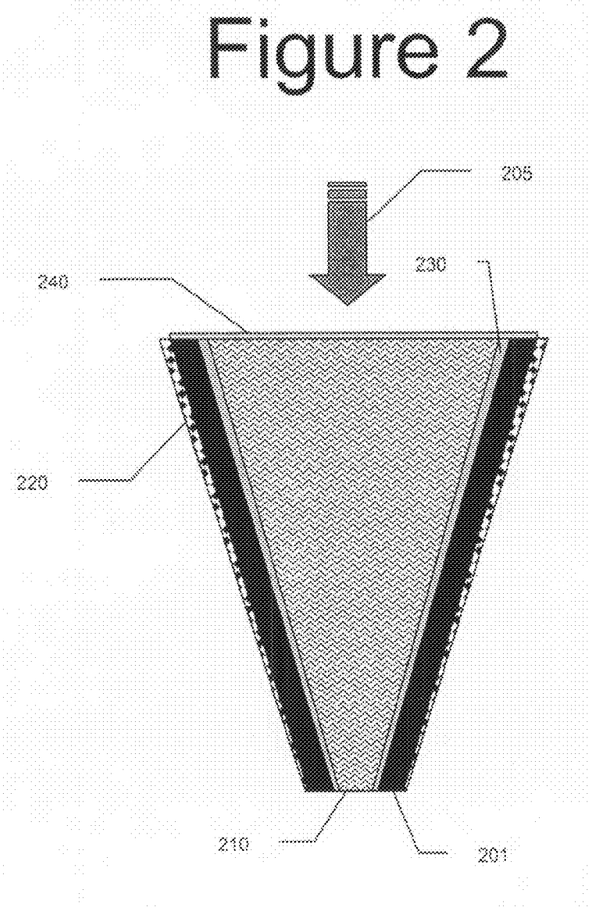
FIG. 2 is a block diagram of a slab laser gain medium according to the present invention.

As shown in FIG. 2, an embodiment of a composite slab laser gain medium according to the present invention prevents the formation of a hotspot in the emissive, doped portions of the laser gain medium 201. An embodiment of a composite slab laser gain medium according to the present invention comprises a core of undoped host material 210 clad in layers of doped variants of host material 201 that are directly bonded to the undoped core 210. At the bond interface between the doped and undoped layers, there is disposed a dichroic coating 230 that allows incoming pump light 205 to pass into the doped gain medium 201 but reflects resonant light generated by stimulated emission, thereby locking the resonant light into the doped gain medium 201. The top of the composite gain medium is coated with an anti-reflective coating 240 to maximize transmission of pump light 205 and the outsides of the doped cladding layers 201 are coated with a highly reflective coating 220 that reflects both the pump light and resonant light back into the gain medium. In such an embodiment, the undoped core material and the doped cladding layers form the pump cavity.

Alternate embodiments of the present invention may omit the anti-reflective coating or the dichroic coating, or may replace them with other special purpose coatings or layers. An embodiment of the present invention having an anti-reflective coating at the bond interface of the undoped core and the doped cladding instead of a dichroic coating provides a greater path length through the gain medium without having to alter the dimensions of the medium itself. The v-shape depicted in FIG. 2 is purely illustrative and not meant to limit the present invention in terms of geometric configuration.

In an embodiment of a composite slab laser gain medium according to the present invention, the undoped host material is YAG and the doped cladding layers are Yb:YAG. Alternate embodiments of the present invention may use neodymium (Nd) or erbium (Er) as dopants. Still further embodiments of the present invention may use Yttrium Lithium Fluoride (YLF), sapphire, Lithium Strontium Aluminum Fluoride (LiSAF), or various glasses or semiconductors as a host material. Still further embodiments may use different compatible materials for the optical core and cladding, such as a sapphire core with a doped YAG cladding.

In an embodiment of a composite slab laser gain medium according to the present invention, the dichroic coating 230 at the bond interface of the doped cladding 201 and the undoped optical core 210 may be configured to pass wavebands with 940 nm center wavelengths associated with light from a pump such as a laser diode, and configured to reflect wavebands with 1030 nm center wavelengths associated with stimulated emission by the doped gain medium. Alternate embodiments of the present invention may employ a variety of pump sources at a variety of pump wavelengths, and the dichroic coating may be adjusted accordingly to permit pump light to pass into the gain medium while reflecting the resonated light. The present embodiment employs a multilayer dielectric type of dichroic coating. Alternate embodiments of the present invention may use different coating types.

Alternative embodiments of the present invention may also contain a different number of doped gain media slabs 201. An embodiment having only one slab of doped, resonator gain medium may require an additional reflective coating on portions of the undoped core that are not configured to accept pump light and are not clad in gain medium.

Embodiments of a composite slab laser gain medium according to the present invention may vary in both shape and composition. While the present embodiment shows a tapered gain medium having a YAG core and Yb:YAG resonator cladding, alternate embodiments may employ alternate material combinations such as a YLF core or ER:YAG doped layer. Embodiments of the present invention may employ a tapered cross-section to help pump one or both doped sections uniformly throughout their volume. Yet other embodiments of the present invention may employ an overall shape with a rectangular cross-section instead of a tapered one or may employ a completely triangular cross-section. Further embodiments still may employ a rectangular cross-section core with tapered or hemispherical pump cavity, or may employ a convex or concave cross-section core with either periphery-tracing or void-filling cladding to either maintain a concave or convex cross-section, or produce a rectangular, elliptical or other cross-section shape for the overall gain medium. Yet further alternative embodiments of the present invention may be configured with only a single doped resonator gain medium slab of varying shape or size. Further alternatives still may employ more than two cladding slabs. An embodiment having a square undoped core, for example, may accommodate one, two, or three independent cladding slabs. The resonator gain medium cladding slabs are each independent of the others from a structural standpoint, so the number of doped slabs in a given embodiment of the gain medium depends on the intended application and possible laser resonator configurations.

Figure 3A:
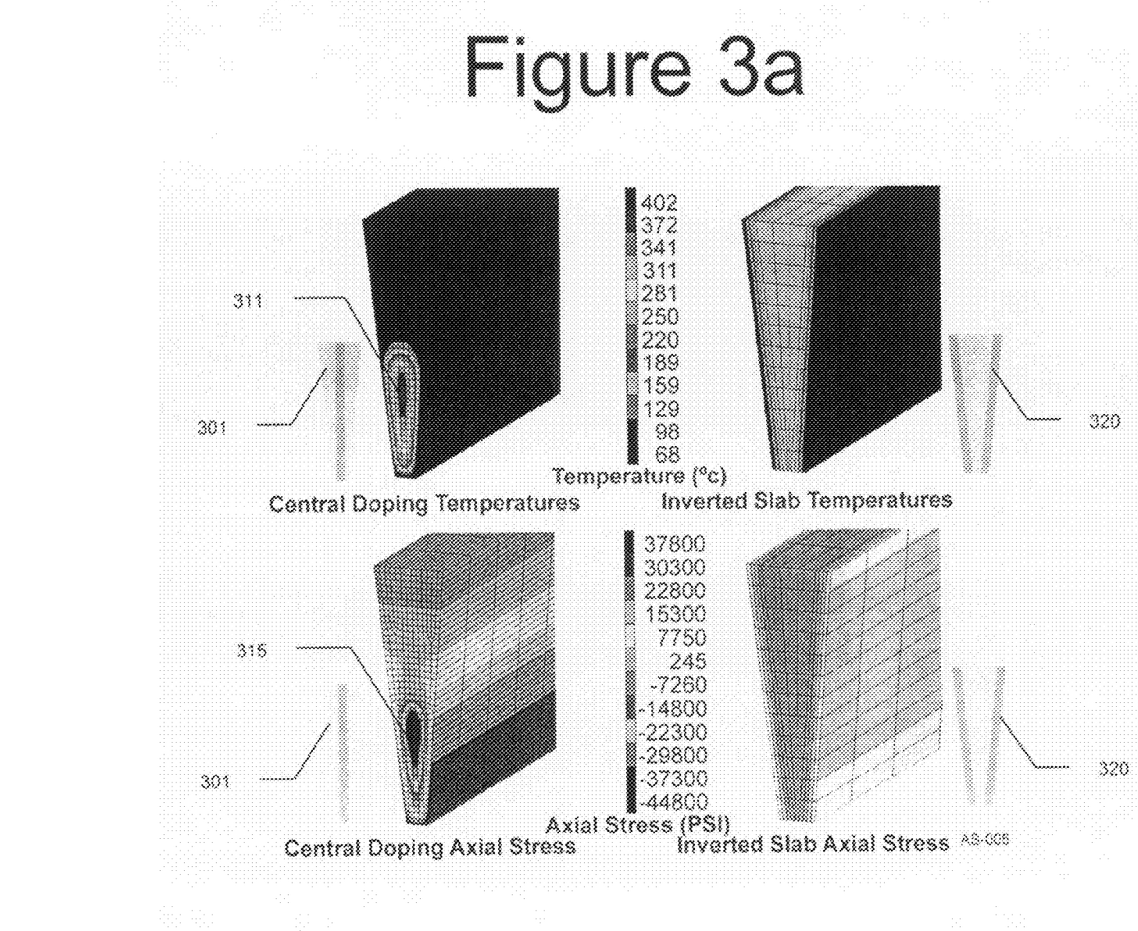
FIG. 3a shows comparisons of temperature and stress gradients between prior art and the present invention.

FIG. 3a shows a comparison of thermal and mechanical stress gradients in a prior art composite slab laser gain medium and a composite slab laser gain medium according to the present invention. In the prior art composite slab 301, a strong temperature gradient 311 develops height-wise in the doped, emissive core. The temperature range in the core of a conventional composite slab laser gain medium may vary from as low as 330 degrees centigrade at the top, to as much as 410 degrees centigrade at the center of the hotspot 311 in the lower half of the doped core. This causes an attendant axial stress causing outward pressure emanating from the hotspot 315 in the doped core. This combination of heat and pressure may lead to thermal lensing and birefringence as the index of refraction in the stressed 315 hotspot 311 changes relative to the rest of the doped, emissive medium. This leads to degradation in beam quality and may also cause mechanical failure of the gain medium.

In contrast, an embodiment of a composite laser gain medium according to the present invention 320 does not exhibit a hotspot or a stress center. The undoped core in the depicted embodiment maintains an overall temperature of close to 100 degrees centigrade, while the doped cladding slabs remain at approximately room temperature. Lacking a significant temperature gradient in any axial direction, there is also no attendant axial stress gradient. This prevents the occurrence of OPD and other beam quality degradations due to thermal lensing, birefringence, and similar undesirable effects resulting from a gain medium with a non-homogenous refractive index.

Figure 3B:
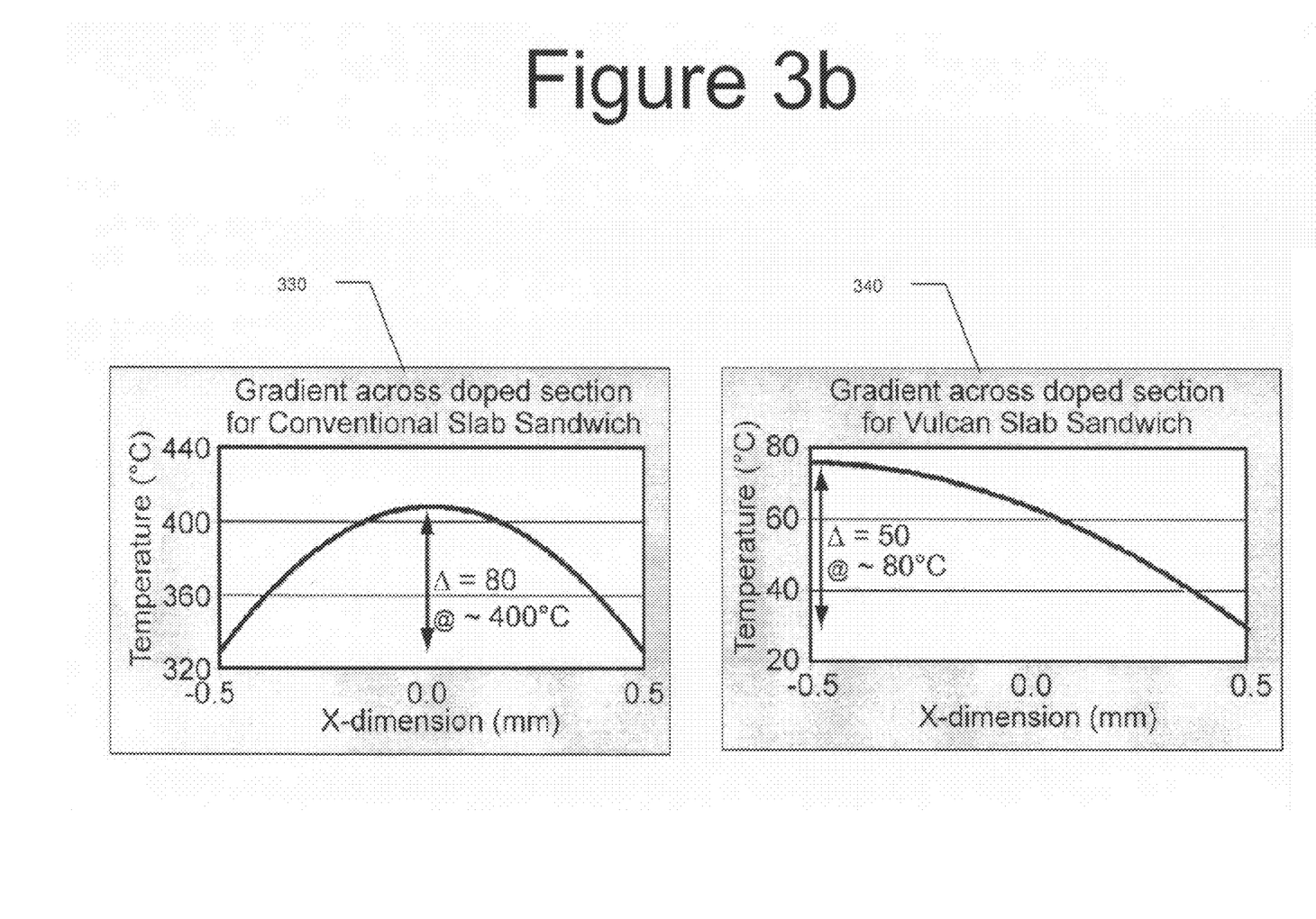
FIG. 3b shows comparisons of temperature gradients in the emissive portions of prior art and the present invention.

FIG. 3b shows a comparison of the temperature gradients, generated by 5 kW pump power, across the emissive portions of a prior art gain medium and a gain medium according to the present invention. The prior-art temperature gradient graph 330 shows temperature variation of up to 80 degrees centigrade an overall maximum temperature of over 400 degrees centigrade across a 1 mm-wide section of doped gain medium. By comparison, the temperature gradient across a 1 mm-wide section of doped gain medium in a composite slab gain medium according to the present invention 340 only has a variation of up to 50 degrees centigrade, and an overall maximum temperature of just under 80 degrees centigrade. As shown by the graphs, a composite slab laser gain medium according to the present invention offers not only decreased thermal and stress gradients in the emissive portions, but also a drastically reduced operating temperature, effectively eliminating OPD.

The stress and thermal analysis results obtained for the inventive embodiments depicted in FIGS. 3a and 3b were obtained using Yb:YAG doped resonators at 5 kW pump power. Inventive embodiments using different resonators or operating at higher pump power levels may display even more pronounced advantages in stress and thermal properties as compared to prior-art composite slab gain media.

Figure 4A:
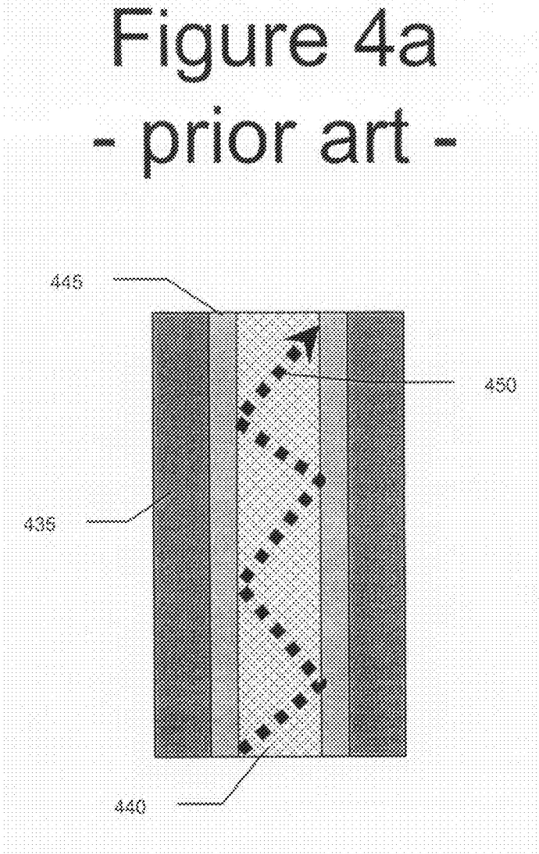
FIG. 4a shows a beam path through a prior art slab laser gain medium.

FIG. 4a depicts an embodiment of a prior art composite laser gain medium configured for cooling for the doped, emissive core 440 by running coolant in channels 445 between the doped core 440 and the undoped cladding 435. The resonant beam 450 is contained within the doped core, in such an embodiment. Cooling is challenging because without the coolant the undoped cladding 435 traps heat within the doped core 440, and with the internal coolant channels 445 there is the added cost and complexity of the gain medium.

Figure 4B:
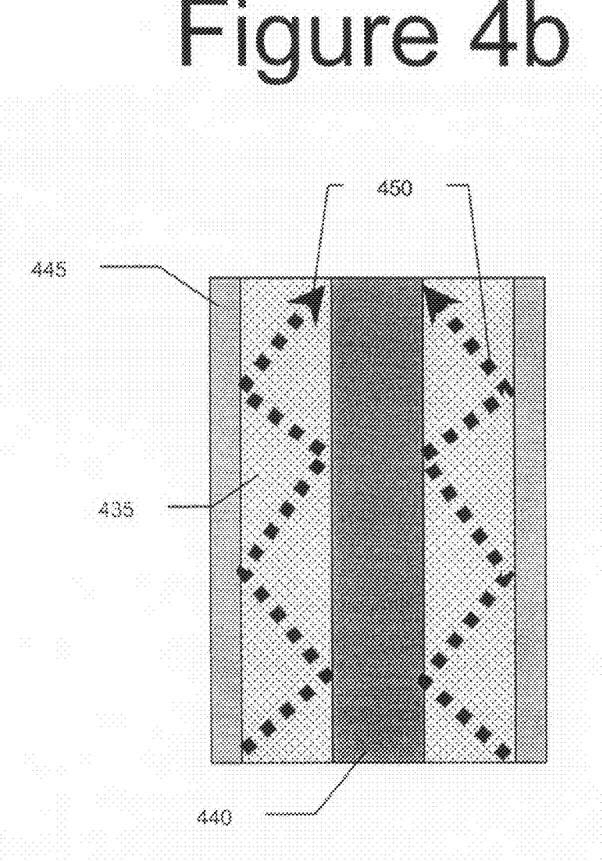
FIG. 4b shows a beam bath through a slab laser gain medium according to the present invention.

By contrast, FIG. 4b depicts a cooled composite laser gain medium according to the present invention. In embodiments of the present invention, an impingement cooling system is a preferred way to maximize the thermal and mechanical stress management and heat-dissipation characteristics of a gain medium according to the present invention.

In the embodiment depicted, the resonator light 450 is contained within the doped cladding material slabs 435, which are cooled by impingement cooling, with the cooling agent or system 445 disposed outside the gain medium. As shown in this embodiment, a composite laser gain medium according to the present invention may be cooled effectively by a cooling system completely external to the gain medium and having no direct interaction with the resonator light contained in the optical core The cooling system may be comprised of conduction-type heat sinks, such as a micro channel cooled heat sink, in contact with the outside surface of the doped cladding. Further alternatives for cooling systems may include impingement-type jet cooling arrays, such as a high density field of small diameter impinging jets of single-phase or two-phase coolant fluid aimed at the outside surface of the doped cladding, or flowing coolant-type arrangements of turbulent flow coolant flowing across the outside surface of the doped cladding.

Figure 4C:
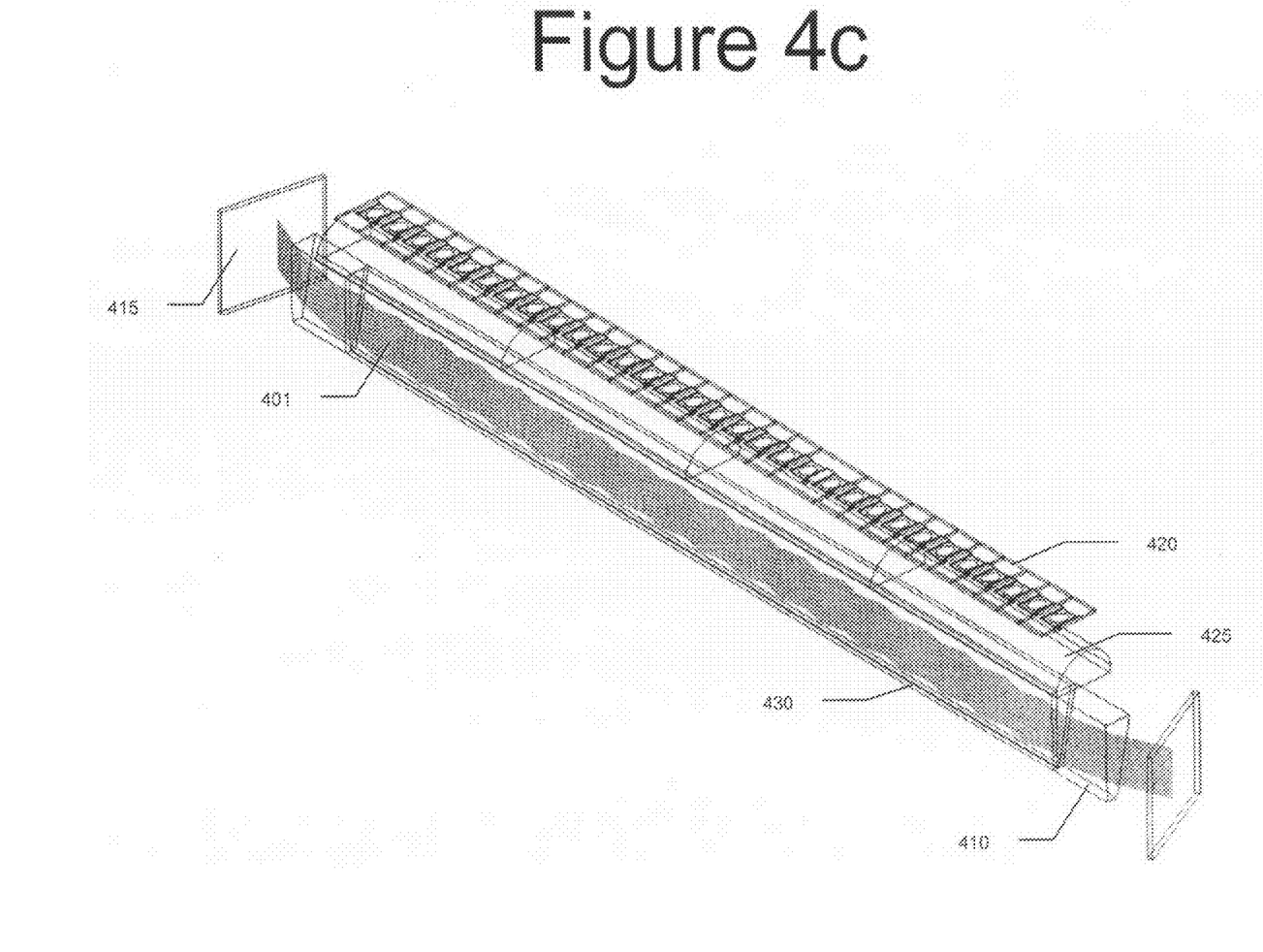
FIG. 4c shows an embodiment of a fundamental light source according to the present invention.

FIG. 4c shows an embodiment of a laser beam source with a composite gain medium according to the present invention. The source is pumped by light emitted from a diode array 420 and focused with a focusing lens 425. The doped cladding layers of the gain medium 430 generate a standing wave of resonant light 401 within the medium, which then passes through undoped end caps 410.

An embodiment of a laser beam source according to the present invention may employ a YAG core with Yb:YAG doped cladding in the resonators. Alternate embodiments may employ any of the previously disclosed alternate host materials or dopants, and may also employ other suitable materials not explicitly listed herein.

An embodiment of the present invention may employ pump diodes that generate 940 nm center wavelength light, causing a Yb:YAG resonator according to the present invention to produce 1030 nm center wavelength light through stimulated emission. Alternate embodiments may employ different pump light wavelengths, different resonator materials, or may pump the gain medium with a different source, such as a laser, a lamp, or a selectively-filtered broad-spectrum light source.

Figure 4D:
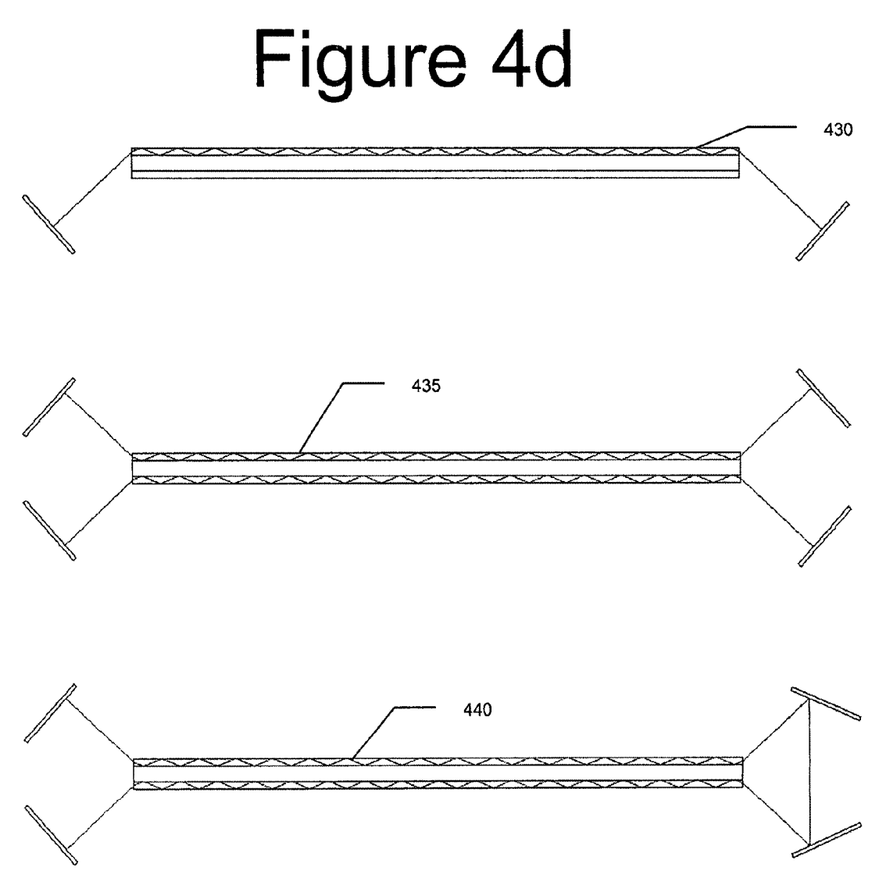
FIG. 4d shows alternative zig-zag embodiments of the present invention.
Figure 4E:
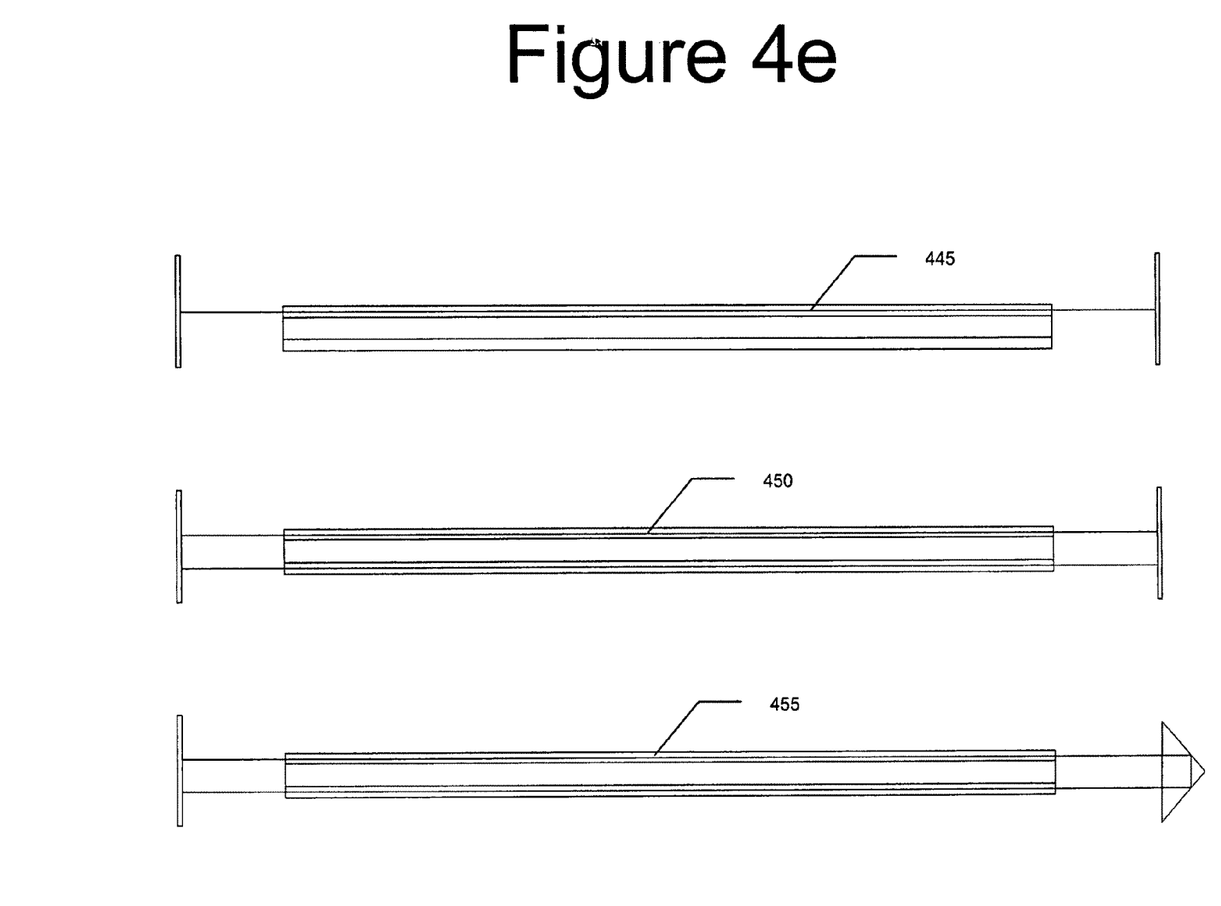
FIG. 4e shows alternative non-zig-zag embodiments of the present invention.

FIG. 4d shows some alternative embodiments of the present invention using a zig-zag beam path through the doped cladding material. Only one cladding layer 430 may be employed, both cladding layers may be used for two different beams 435, and the same beam may be passed through both cladding layers 440. FIG. 4e shows the same single beam single cladding 445, dual beam, dual cladding 450, and single beam, dual cladding 445 arrangements with the beam path moving directly through the resonator(s) instead of following a zig-zag path. Any of these beam path and usage variations may be employed using an embodiment of the present invention. Certain combinations of materials and pump light will be better suited to one or another of the above-listed variations.

One application embodiments of a laser beam source according to the present invention is in an embodiment of a laser system with a laser head having an array arrangement of laser sources. Diode drivers may drive the light pumps in such a laser head, and the cooling system may provide impingement cooling to the individual slabs of media in the array. Such an embodiment may have the slab media disposed in linear, circular, or any other suitable array configuration.

Embodiments of such a laser head may employ coolant lines running through the laser head filled with coolant pumped and circulated by a main cooling system. Alternative embodiments may employ arrays of Peltier devices disposed along and between the slabs of gain medium, with the devices all centrally controller by the cooling system. Yet further embodiments may combine a coolant line and peltier device approach, whereby a coolant reservoir is cooled with a Peltier device, and the coolant then circulated through cooling lines disposed inside the laser head.

Embodiments of such a laser head may employ secondary laser sources instead of pump diodes, or may use any other suitable arrangement of pump light sources. Further embodiments may also use a different slab gain medium shapes, such as a partial ellipse or a rectangle or a triangle shaped gain medium. Yet further embodiments of a laser head according to the present invention may employ a horizontal or vertical array of gain media or any other suitable layout.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A composite slab laser gain medium, the medium comprising:
   an optical core comprised of an undoped first material;
   a resonator gain medium cladding covering at least one side of the core, wherein the cladding is comprised of a second material doped with rare-earth or transition metal ions and further wherein the cladding is directly bonded to the optical core; and
   a dichroic coating at the bond interface of the core and the cladding, wherein the coating substantially permits pump light to pass through the core and into the cladding, but substantially prevents resonant light from passing from the cladding back to the core.

2. The medium of claim 1, wherein the first and second materials both comprise Yttrium Aluminum Garnet (YAG).

3. The medium of claim 1, wherein the dopant comprises Ytterbium (Yb) ions.

4. The medium of claim 1, wherein the pump light has a 940 nm center wavelength and the resonant light has a 1030 nm center wavelength.

5. The medium of claim 1, further comprising an anti-reflective coating disposed on a surface of the optical core configured to accept injected pump light.

6. The medium of claim 1, further comprising a reflective coating that is disposed on an external face of the cladding, wherein the reflective coating substantially contains the resonant light within the gain medium.

7. The medium of claim 1, wherein the optical core has a trapezoidal cross-section such that the top of the core is configured to accept pump light and is wider than the bottom of the core.

8. A laser apparatus comprising:
   a composite slab laser gain medium, the medium comprised of:
      an optical core comprised of an undoped first material;
      a resonator gain medium cladding covering at least one side of the core, wherein the cladding is comprised of a second material doped with rare-earth or transition metal ions and further wherein the cladding is directly bonded to the optical core; and
      a dichroic coating at the bond interface of the core and the cladding, wherein the coating substantially permits pump light to pass through the core and into the cladding, but substantially prevents resonant light from passing from the cladding back to the core; and
   a pump light source that pumps light into the gain medium.

9. The apparatus of claim 8, further comprising a focusing lens optically coupling the pump source and the gain medium.

10. The apparatus of claim 8, further comprising an undoped end cap composed of the same material as the optical core; wherein the end cap is attached to a lengthwise end of the gain medium and has a shape corresponding to a cross-section of the gain medium.

11. The apparatus of claim 8, the pump light source comprising at least one pump diode.

12. The apparatus of claim 8, further comprising a heat transfer element, wherein said heat transfer element is disposed along an external face of the cladding portion of the gain medium.

13. The apparatus of claim 8, wherein the optical core of the gain medium has a trapezoidal or triangular cross-section.

14. The apparatus of claim 8, wherein the gain medium is longer than it is wide or high.

15. A laser array, the array comprising a plurality of laser apparatuses as disclosed in claim 8.

16. The laser array of claim 15, further comprising: a common core to which the bottom of each gain medium is attached.

17. The apparatus of claim 12, said heat transfer element comprising at least part of an impingement cooling system.

18. A method of dissipating heat from laser gain medium, the method comprising:
   disposing a resonator gain medium cladding on a side of an optical cavity of the gain medium, wherein the optical cavity is not an optical resonator;
   disposing, between the cladding and optical cavity, a dichroic layer that substantially permits pump light to pass from the optical cavity into the cladding, but substantially prevents resonant light from passing from the cladding into the optical cavity;
   disposing a heat transfer element on a side of the cladding without the dichroic layer such that the gain medium is cooled by impingement cooling.

19. A heat-dissipation system for a laser, the system comprising:
   a composite slab laser gain medium, the medium comprised of:
      an optical core comprised of an undoped host material;
      a resonator gain medium cladding covering at least one side of the core,
   wherein the cladding is comprised of the host material doped with rare-earth or transition metal ions and
      further wherein the cladding is directly bonded to the optical core; and a dichroic coating at the bond interface of the core and the cladding, wherein the coating substantially permits pump light to pass through the core and into the cladding, but substantially prevents resonant light from passing from the cladding and into the core; and
   a heat transfer element that cools the gain medium, wherein said element is disposed on the cladding, on the side of the cladding that does not have a dichroic coating.

* * * * *